Dec. 30, 1969 C. L. EMMERICH 3,487,204

HIGH ACCURACY PULSE RESET INTEGRATOR

Filed Sept. 27, 1966 4 Sheets-Sheet 1

INVENTOR.
CLAUDE L. EMMERICH

BY Karl A. Ohralik

ATTORNEY

INVENTOR.
CLAUDE L. EMMERICH
BY Karl A. Ohralik
ATTORNEY

Dec. 30, 1969 C. L. EMMERICH 3,487,204

HIGH ACCURACY PULSE RESET INTEGRATOR

Filed Sept. 27, 1966 4 Sheets-Sheet 3

INVENTOR.
CLAUDE L. EMMERICH

BY Karl A. Ohralik

ATTORNEY

HIGH ACCURACY PULSE RESET INTEGRATOR

Filed Sept. 27, 1966 4 Sheets-Sheet 4

INVENTOR
CLAUDE L. EMMERICH
BY Karl a. Ohralik
ATTORNEY

United States Patent Office 3,487,204
Patented Dec. 30, 1969

3,487,204
HIGH ACCURACY PULSE RESET INTEGRATOR

Claude L. Emmerich, Scarsdale, N.Y., assignor to Singer-General Precision, Inc., Little Falls, N.J., a corporation of Delaware Filed Sept. 27, 1966, Ser. No. 582,367
Int. Cl. G06g *7/18;* G06j *1/02*
U.S. Cl. 235—183 12 Claims

ABSTRACT OF THE DISCLOSURE

A circuit for resetting a reset type integrator with impulses of very low harmonic content. In a first embodiment thereof, means are provided for deriving 1—cosine type pulses by superimposing an alternating potential on a direct potential. The level of the A.C. is regulated so that its magnitude is slightly greater than the D.C. A full cycle of the 1—cosine waveform is then selected for resetting by a diode which produces a pulse each time the 1—cosine waveform passes slightly negative. The coincidence of this pulse with a positive or negative potential appearing at the integrator output is used to provide a switch controlling signal for positioning switch means to apply the 1—cosine pulse to the input of the integrator with a polarity opposite to that of the integrator's output thereby resetting the integrator. Over a period of time, the number of positively and negatively applied reset pulses may be counted and the difference in such numbers is a digital representation of the analog input potential to the integrator. In a second embodiment of this circuit, means are provided for utilizing reset pulses of the sine $^2$ form which pulses have even lower harmonic content than the 1—cosine type reset pulses.

Figure 1:
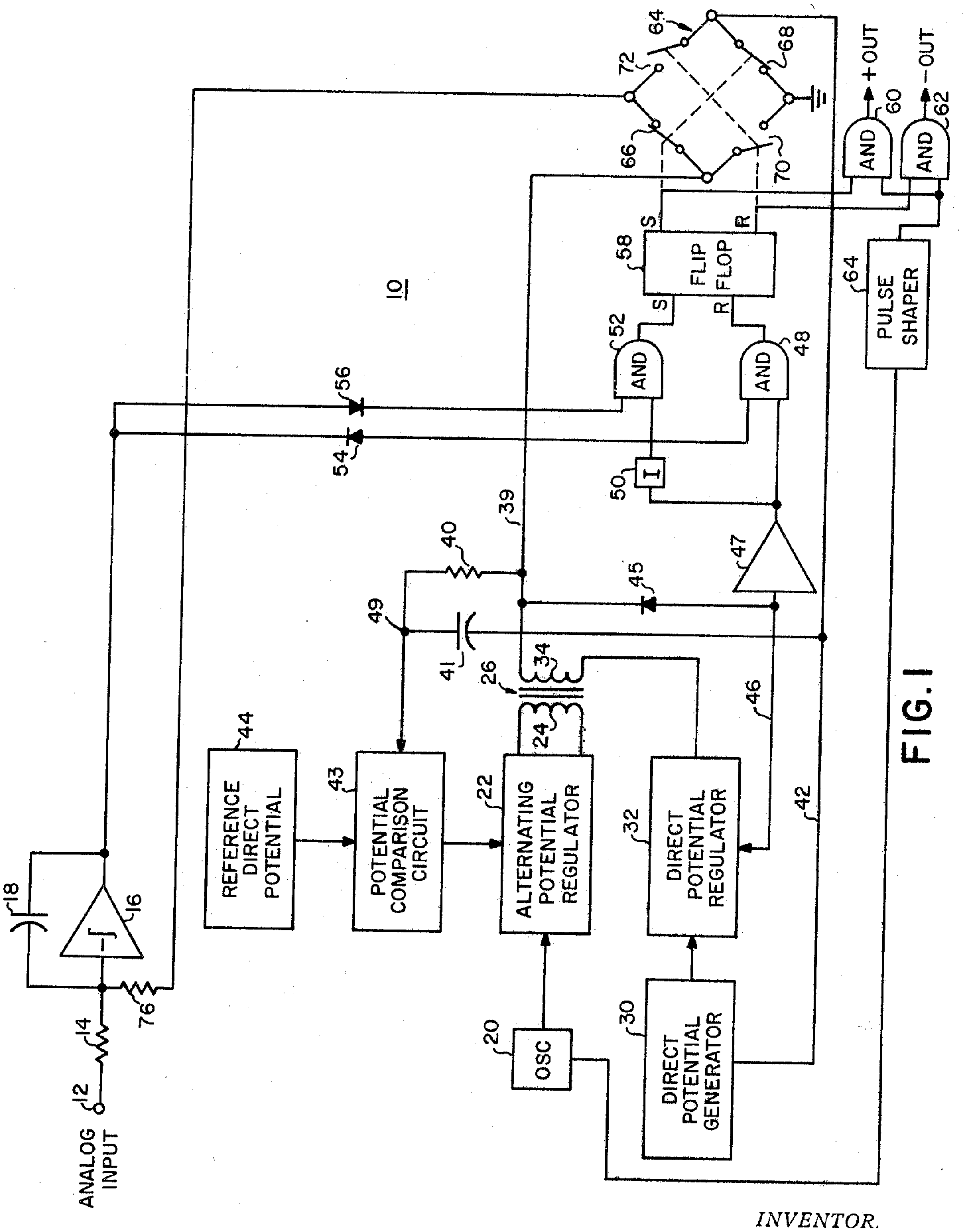

This invention relates to servo systems and more particularly to reset integrators which integrate analog input potentials and produce digital potentials effective to reset such integrators as well as to simultaneously provide digital outputs.

In many servo systems it is necessary to convert information in analog form to digital form. This conversion is frequently required because high accuracy computations are necessary in these systems and such high accuracies are obtainable only in digital computers. However, the advantages of inherently high accuracy digital computers are largely vitiated unless the conversion accuracies are commensurately high.

Relatively high accuracies in analog to digital conversions have been achieved with reset integrator circuits. In these circuits, an integrator receives and integrates an analog input potential. Impulses are produced and applied to the integrator in such polarity and number so as to drive the integrator potential toward zero.

Impulses are derived from square wave pulses or for higher accuracy, half sine waves have been utilized. In other cases, modified sine waves have been utilized in generating such reset pulses. Of course, it is necessary that the pulses used for resetting be as nearly identical to each other as possible or that the impulse content be the same; the impulse content being the integral of the pulse over its period. If the impulse content of the different pulses varies to an appreciable extent, the number of pulses required for resetting can yield very erroneous results.

Three factors can separately influence the impulse content, viz, the amplitude, period and waveform of the pulse. For improving accuracy of such prior systems, the impulse content of pulses can be controlled by sampling the pulses in an averaging circuit that simply measures the area under the pulse without regard for the separate pulse factors. Comparison of such measurement with a standard reference then yields the required error signal which may be used to correct the pulse characteristics. For example, the pulse amplitude may be controlled to correct for pulse content even if the pulse content varies due to presence or absence of a harmonic or has the wrong period, as well as the wrong amplitude.

The aforedescribed practice has met with considerable success. However, certain areas susceptible of considerable improvement exist. In such systems, the pulses utilized for resetting are not the same in every detail as those that are being measured. The pulses applied to the integrator are routed through switches that are not in the monitoring circuit and which may introduce errors. Also, the monitor circuit is physically removed from the resetter, giving rise to transmission losses and changes in waveform between resetting and monitor pulses.

The variations in impulse content may be reduced by causing the switches to change state during intervals of zero current since switch characteristics are easier to control in either an "on" or "off" state than during a switching transient. For facilitating such switching, intervals of zero current are interlaced between pulses, and switches are changed during such zero current intervals.

Harmonic waveform distortions may be the cause of serious impulses content variations since transmission losses are greatly affected by the bandwidth and harmonic content of the pulses involved. The losses themselves are not critical but rather the changes in losses are significant. As an example, if a certain harmonic component is always present in reset pulses and always absent in the monitoring circuit, the initial scale-factor calibration may be adjusted to account for the difference. However, if such a component is always absent in the monitoring circuit and appears only occasionally in the reset circuit, depending on certain factors such as temperature, attitude of a movable adjoining component, proximity of other electronic circuitry, etc., then the impulse content contributed by the subject harmonic in resetting the integrator will never be registered by the monitoring circuit and its presence cannot be accounted for, especially if it is intermittent. This leads to uncertainties and instabilities of the resetting process.

While these circuits have been highly successful and effective in providing performance with accuracies of the order of .01% error, improved accuracies are required in certain situations. For example, if acceleration changes of one micro-*g.* are to be measurable in the presence of a one-*g.* field, or if drifts of 0.01 degree per hour are to be measurable in strap-down gyros exposed to 3 degrees per second, the pulses must be stable to one part per million, or of the order of .0001% error.

In accordance with this invention, increased accuracies of the order of .0001% error, as described in the last preceding paragraph, are practically achievable by the provision of improved and unique means for producing resetting pulses which are very low in harmonic content and utilizing such pulses for integrator resetting. In accordance with different embodiments of the invention, provision is made for producing resetting pulses derived from a periodic waveform corresponding to the function $E_0-E_1 \cos \omega t$ and from a waveform corresponding to the function $E \sin^2 \omega t$, respectively. For the sake of convenience, these pulses will be referred to hereinafter as pulses of the 1—cosine and sine$^2$ type, respectively. Means are provided for applying these pulses in either a positive or negative polarity to the input of the integrator for resetting same. Such pulses, as compared with other resetting pulses utilized heretofore, are relatively free of harmonic content, whereby the impulse content of the pulse used for resetting, pulse torquing and other purposes may be very precisely controlled. Distortions which may arise from harmonics are eliminated or very greatly minimized, facilitating the accuracies mentioned.

In one embodiment of the invention, means for producing pulses of 1—cosine type is provided. An integrator receives an incoming analog potential and integrates such potential. The resetting circuit includes means for deriving 1—cosine pulses by superimposing an alternating potential on a direct potential and means for interrelating the magnitudes and for selecting a phase for providing the pulses 1—cosine character to reset the integrator. The level of the alternating potential is regulated so that its magnitude is slightly greater than the direct potential. Provision for selecting a full cycle of the 1—cosine wave for resetting includes a diode which produces a pulse as the 1—cosine wave passes slightly negatively. The coincidence of such a pulse with a positive or negative potential appearing at the integrator output is used to provide a switch controlling signal. Such a signal positions switch means to apply the 1—cosine pulse to the input of the integrator in a polarity opposite to that appearing at the integrator output, thus, reducing its integrated value. The action is continual and, if the analog potential is different from zero, over an interval of time, the number of pulses of one polarity will be greater than the number of pulses of the opposite polarity. Different output signals are produced corresponding to the positively negatively applied reset pulses. Over an interval of time, the number of positively and negatively applied pulses may be counted and the difference in such numbers is a digital representation of the analog input potential. Inasmuch as the 1—cosine pulses are relatively free of harmonic content and the impulse content of the pulses is therefor dependent almost solely upon the fundamental of such pulses, the resetting is performed with high accuracy.

In another embodiment of the invention a sine$^2$ type pulse producing means is cooperative with the other circuitry as briefly described, to effect resetting of an integrator with high accuracy. The sine$^2$ type pulses may be produced by rectifying a sine wave at low potential and highly amplifying the resultant half wave pulses. Such pulses then take on a character of sine$^2$ pulses and are effective in the same way as the 1—cosine pulses, hereinabove described, for resetting an integrator circuit, but with even less harmonic content and consequent greater accuracy.

It is, therefore, a principal object of this invention to greatly improve the reliability and accuracy of pulse resetting integrator systems by minimizing the harmonic content of reset pulses.

It is another object of this invention to facilitate the production of reset pulses in reset integrator circuit which are of uniform impulse content.

It is another object of this invention to facilitate the production of reset impulses in a reset integrator circuit which are relatively free of distorting harmonics.

Figure 2:
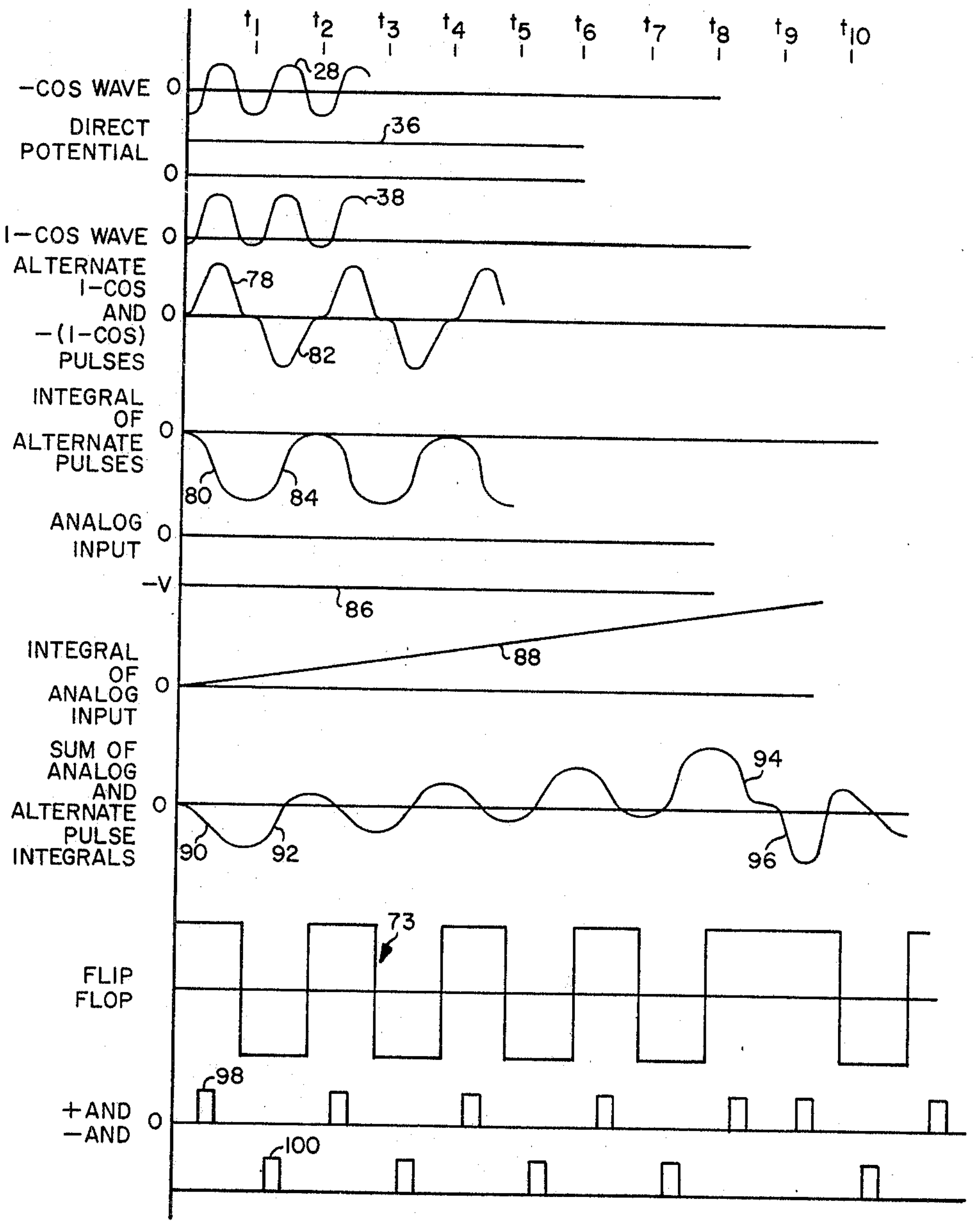
Figure 3:
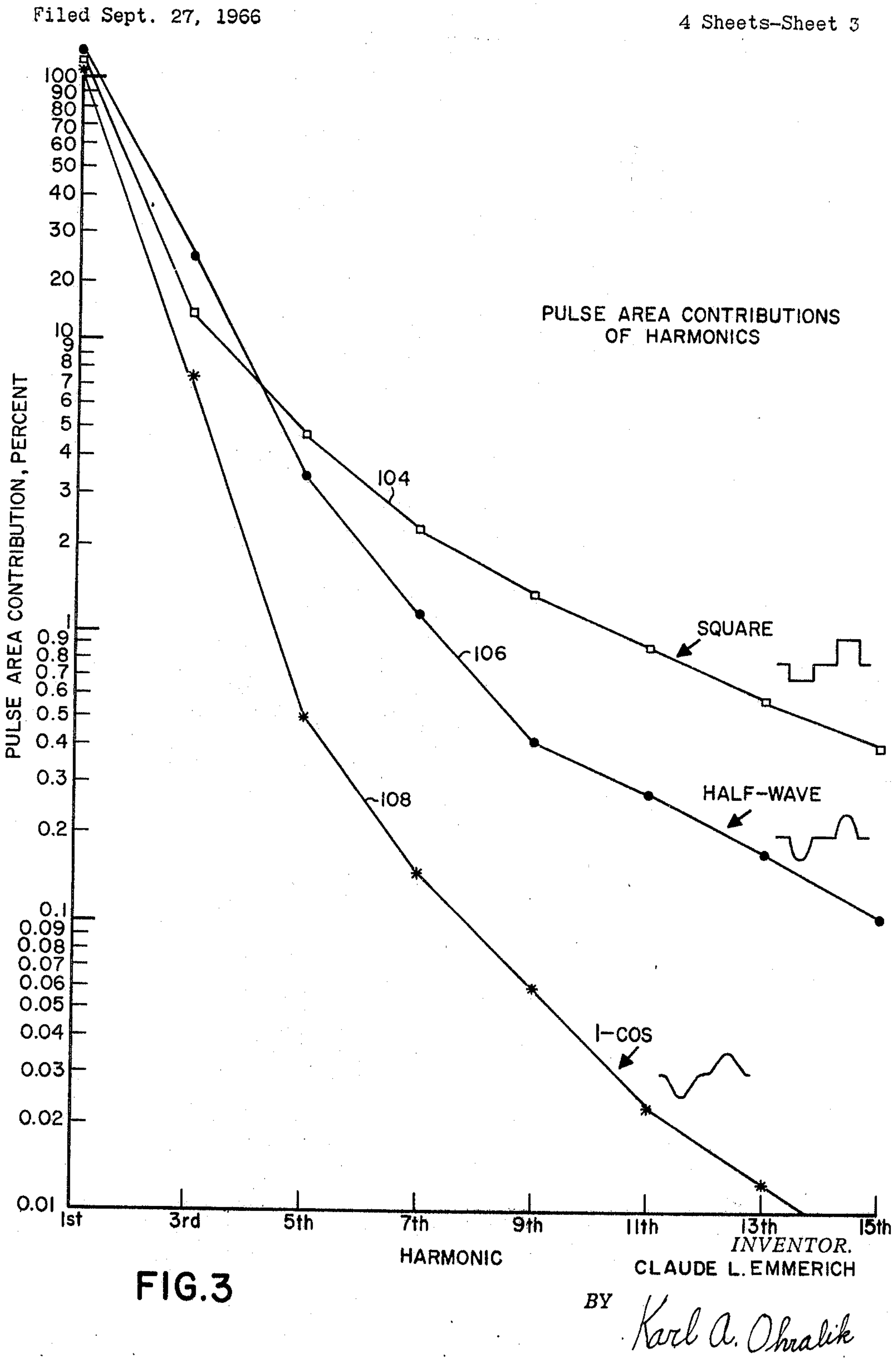
Figure 4:
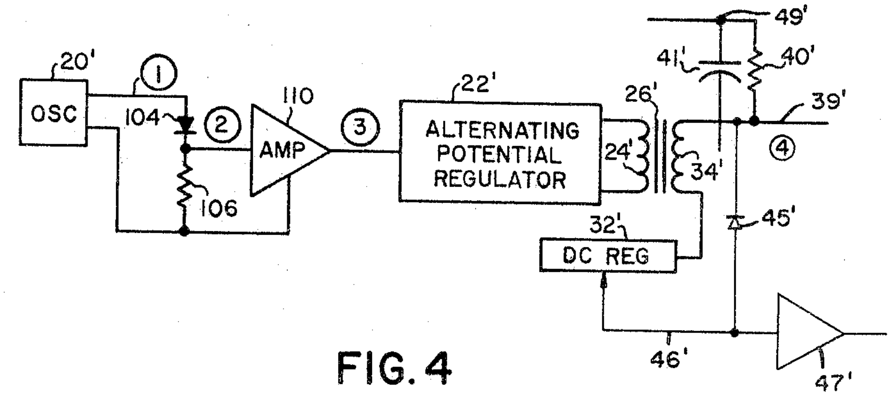
Figures 5, 6:
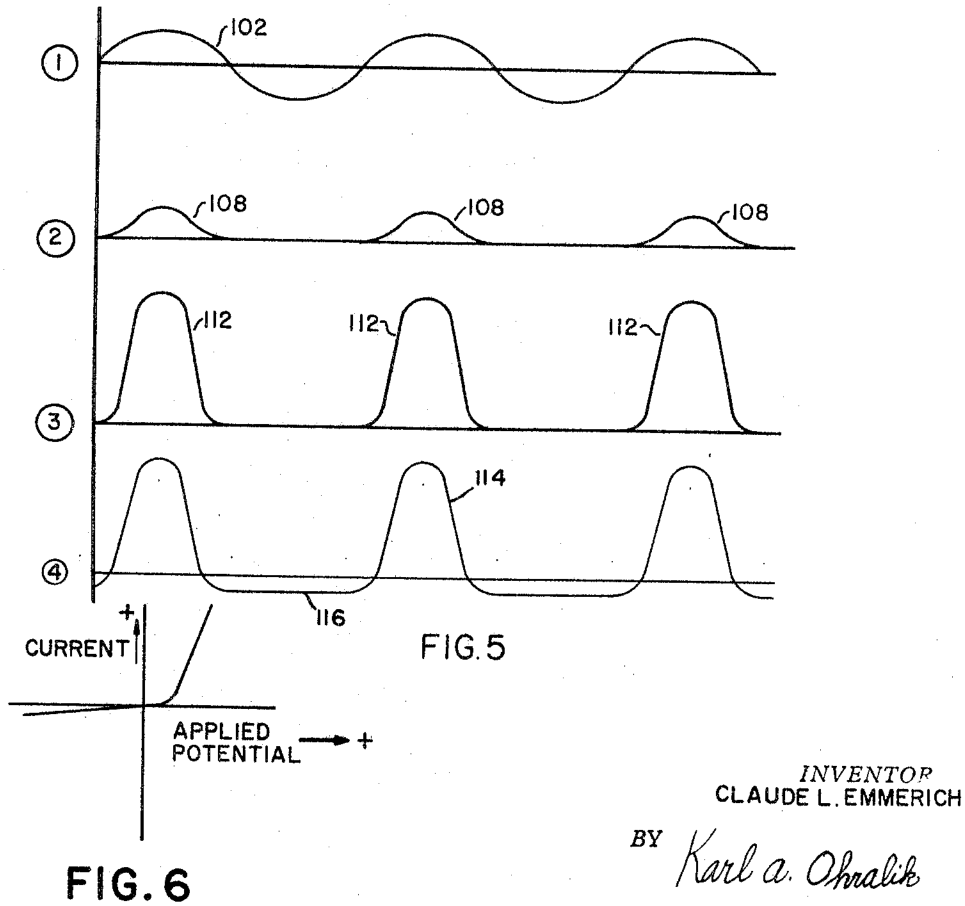

Other and further objects and advantages of the invention will become apparent from the following detailed description thereof taken with the accompanying drawings in which:

FIGURE 1 shows schematically the several components forming a high accuracy pulse reset integrator circuit, according to one embodiment of this invention, FIGURE 2 illustrates waveforms of potentials appearing at various points of the circuit of FIGURE 1, FIGURE 3 is a graph illustrating the impulse content contribution of various harmonics in the circuit of FIGURE 1, FIGURE 4 is a schematic representation of the portion of a circuit for producing resetting pulses in accordance with an other embodiment of the invention, FIGURE 5 illustrates waveforms of potentials appearing at points of the circuit of FIGURE 4, and FIGURE 6 is a graph showing the characteristics of a diode rectifier.

Referring now to FIGURE 1 of the drawings for a more detailed description of the invention, 10 represents generally the entire circuit incorporating this invention. An input terminal 12 is provided for receiving an analog input potential and is coupled through a resistor 14 to the input of an amplifier 16. The amplifier 16 is of an inverting type with a high input impedance and presenting a substantially zero input potential. For integrating potentials applied to the input of amplifier 16, a capacitor 18 is directly connected between the input and output of this amplifier. The amplifier circuit is thus responsive to one or more inputs to sum or integrate the several inputs so applied. The amplifier 16, together with the capacitor 18 as a unit, are referred to herein as the "integrator."

For deriving resetting potentials for the integrating amplifier circuit described, an oscillator 20 provides an alternating potential which is controller in amplitude by an alternating potential regulator 22 and applied to the primary winding 24 of a transformer 26. Such a potential is as shown at 28 in FIGURE 2 of the drawings. Since either polarity of a wave may be chosen and its phase at an initial time determines its character, sine or cosine, it is regarded as a minus cosine wave, designated, —cos. Also, a direct potential generator 30 is provided which applies its output through a direct potential regulator 32 to the secondary winding 34 of transformer 26. This direct potential is shown at 36 in FIGURE 2. In this manner, and, in accordance with a feature of this invention, the secondary winding 34, by transformer action, has induced therein an alternating potential superimposed upon the direct potential applied directly from the direct potential regulator 32 and is selected to be of the character of 1—cosine. Such a superimposed potential is shown at 38 in FIGURE 2. For purposes of deriving slight negative pulses at times of minimum potential of the wave 38, the amplitude of the wave 28 is made slightly greater than the magnitude of direct potential 36. Thus, during a short interval during each cycle, the wave is slightly negative.

Controlling signals for the regulator 22 are derived from the line 39 and applied to an averaging circuit including a resistor 40 and capacitor 41 serially connected between line 39 and the return line 42 to direct potential generator 30. The function of this averaging circuit is to produce a direct potential amplitude of waveform 38 (FIGURE 2) at the junction 49 between resistor 40 and capacitor 41. The direct potential appearing at junction 49 is then applied to a potential comparison circuit 43 which also receives a reference direct potential input from a suitable D.C. source as at 44, for example. The comparison circuit 43 continuously compares the average direct potential at junction 49 with the reference direct potential from source 44 to provide an error or correction signal which, in turn, may then be applied to alternating potential regulator 22 for adjusting the amplitude of the alternating potential output therefrom. In this manner and with this arrangement the amplitude or level of the alternating potential applied to primary winding 24 may be maintained substantially constant.

For developing periodic pulses at times which the 1—cosine wave passes through zero, a diode rectifier 45 is connected across the lines 39 and 46 on which is impressed the 1—cosine wave. The diode 45 is back biased at all times except during the slight negative excursions of the superimposed potential and, thus, a slight negative pulse is passed by the diode at such time. The slight negative pulse, so produced, is applied to the input of a pulse amplifier 47 which increases the magnitude of the pulse. The unamplified negative pulse is also fedback along return line 46 to the direct potential regulator 32 for controlling the level of the direct potential applied to secondary winding 34. In operation, regulator 32 continuously adjusts the D.C. bias in the transformer secondary 34 to maintain the amplitudes of the negative pulses passed by the diode substantially constant. This, in turn, insures that the amplitude of wave 28 will always be slightly greater than the magnitude of the direct potential 36 owing to similar regulation of the former by the action of the averaging circuit as described hereinbefore. The output of pulse amplifier 47 is applied to one input of a negative coincidence or AND circuit 48 and to the input of an inverter 50. The output of inverter 50 is connected to one input of a positive coincidence or AND circuit 52. The AND circuits 48 and 52 are respectively responsive to the coincidence of negative and positive potentials at their inputs to produce output potentials and not otherwise. Accordingly, one input of each of the AND circuits 48 and 52 is conditioned in response to each pulse developed by the rectifier 45. The pulses applied to AND circuit 48 will be negative pulses and, due to the inverter 50, the pulses applied to AND circuit 52 are positive pulses.

For selectively conditioning the other inputs of AND circuits 48 and 52, the output of amplifier 16 is connected through a diode 54 to the other input of AND circuit 48 and through a diode 56 to the other input of AND circuit 52. These diodes are oppositely poled, that is, diode 54 has its cathode connected to the output of amplifier 16 and its anode connected to an input of AND circuit 48 while diode 56 has its anode connected to the output of amplifier 16 and its cathode connected to an input of AND circuit 52. Thus, negative potentials produced at the output of amplifier 16 are passed by the diode 54 and positive potentials at the output of amplifier 16 are passed by the diode 56. It is, therefore, clear that in response to positive input potentials at terminal 12, the negative integrated potential is applied through diode 54 to one input of AND circuit 48 and at times of negative impulses applied through amplifier 47 to the other input of AND circuit 48; both inputs of this AND circuit are conditioned and an output potential is produced. Similarly, at times of a negative potential applied to the input terminal 12, the amplifier 16 produces a positive output potential which is applied through rectifier 56 to one input of AND circuit 52 and the inverted negative pulses produced by the amplifier 47 condition the other input of AND circuit 52 whereby both of its inputs are conditioned and an output potential is produced.

The output potentials of AND circuits 48 and 52 are used for setting or resetting a bistable, flip-flop circuit 58. The respective set and reset outputs of the flip-flop circuit 58 are applied, respectively, to inputs of AND circuits 60 and 62. The other two inputs of each of these AND circuits are connected to the output of a pulse shaper circuit 64, receiving its input from oscillator 20. The pulse shaper circuit 64 is effective to condition one input of each of the AND circuits 60 and 62 during each cycle of operation of the circuit. Accordingly, if the flip-flop is in a set condition, one of the AND circuits, 60, will produce an output, and if it is in a reset condition, the other of the AND circuits 62 will produce an output potential.

The output of flip-flop circuit 58 also controls the switches in a reversing circuit 64. This circuit includes pairs of switches 66–68 and 70–72 connected in a bridge arrangement with switches 66 and 68 opposite each other and switches 70 and 72 opposite each other. These switches are shown as being mechanical in nature, however, in reality, they are electronic switches and are shown as they are only for purposes of simplicity and brevity in explanation. The switches 66 and 68 are operable to open and close in unison with each other and the switches 70 and 72 are operable to open and close in unison with each other and the switch pairs are operable inversely with respect to each other. That is, when one switch pair is closed, the other is opened and vice versa. The set output potential of flip-flop 58 is shown generally at 73 of FIGURE 2. The reset output is the exact inverse of this set output.

The junction between switches 66 and 70 is connected to line 39 and the junction between switches 68 and 72 is connected to line 41 forming the return to direct potential generator 30. Thus, the composite potential, 1—cosine, shown at 38 in FIGURE 2 of the drawings, is impressed upon these junctions.

The junction between switches 68 and 70 is grounded and the junction between switches 66 and 72 is connected through a resistor 76 to the input of amplifier 16. Thus, it is observed that with switches 66 and 68 closed and switches 70 and 72 open, a positive 1—cosine potential may be applied to the amplifier 16 input and with switches 66 and 68 open and switches 70 and 72 closed, a negative 1—cosine potential may be applied to the amplifier 16 input.

For a better understanding of the invention and the operation of circuit 10 in FIGURE 1, it is first assumed that all appropriate components are energized but that no analog input potential is applied to the terminal 12. In this condition, it is also assumed that the reversing switch 64 is in the set condition shown in FIGURE 1, that is, with switches 66 and 68 closed and switches 70 and 72 open. In this condition, from time 0 to $t_1$ in FIGURE 2, a positive 1—cosine potential is applied from line 39, through switch 66 and through resistor 76 to the input of amplifier 16, as shown at 78 in FIGURE 2. During the application of this pulse, the output of the integrator, including amplifier 16, is a potential as shown at 80 in FIGURE 2 of the drawing. This potential reaches a maximum at the time $t_1$, which is the end of the period of the pulse 78. At this time, another negative pulse produced by rectifier 45 is applied through amplifier 47 to AND circuits 48 and 52 in a manner explained hereinabove. However, only AND circuit 48 has its other input conditioned because the negative potential appearing at the output of amplifier 16 is applied through diode rectifier 54 to this other input. Accordingly, this AND circuit produces an output pulse which is applied to the flip-flop circuit 58 to cause it to reset, which results in a reversal of the switch 64 whereby switch pair 70–72 is closed and switch pair 66–68 is opened. Under these circumstances, the next 1—cosine wave is applied negatively to the input of amplifier 16. This is represented by the pulse 82 between times $t_1$ and $t_2$, shown in FIGURE 2. The integral of potential appearing at the output of amplifier 16 from time $t_1$ to time $t_2$ is an increasing wave, as shown at 84. Because the 1—cosine wave applied negatively to the amplifier 16 is of the same wave shape, amplitude and period as the pulse 78, the integrated potential, as shown at 84, reduces to zero which is the initial starting potential at the integrator at time 0. In this manner, the successive alternations of positive 1—cosine and negative 1—cosine pulses appear as shown and the integral of these alternate pulses appear as also shown in FIGURE 2, reaching a maximum value during one interval and reducing to zero during the next succeeding interval.

It is next assumed that an analog input potential, —V, as shown at 86 in FIGURE 2 of the drawings, is applied to input terminal 12. Also, it is assumed that flip-flop circuit 58 is in the set condition whereby switches 66–68 are closed and 70–72 open. The potential represented at 86 is negative in polarity and of substantially constant value. Such a potential may be produced by a number of sensing devices, one of which would be an accelerometer in a space vehicle, for example. The integrating circuit, including amplifier 16 and capacitor 18, would be effective in the absence of other inputs to integrate the potential 86 to produce a wave substantially as shown at 88. However, the integral of both the negative input potential and the 1—cosine wave from time 0 to $t_1$ produces a potential wave as shown at 90. This integrated potential is applied through diode rectifier 54 to the input of AND circuit 48. At times at which the 1—cosine wave produced on line 39 goes through zero, diode rectifier 45 again produces a slight negative pulse which is amplified by the pulse amplifier 47 and applied to the other input of AND circuit 48. In this condition, both inputs of the AND circuit 48 are conditioned and the flip-flop circuit 58 is caused to assume the reset state. In such a condition, the switch pair 70–72 is actuated so as to close and the switch pair 66–68 is actuated so as to open. In this condition, a negative 1—cosine wave is applied through the switch 64, through the resistor 76, to the input of amplifier 16. From time $t_1$ to time $t_2$, after the above-described resetting event occurs, the negative pulse applied to the input of amplifier 16 causes the integrated amplitude of the potential at the integrator to rise, as represented at 92. It is, thus, observed that because of the combined content of the resetting pulse and the continuously applied negative input potential to the amplifier 16, the curve 92 extends to above the zero potential reference line and that the total potential change from time $t_1$ to time $t_2$ is greater than from time 0 to $t_1$.

In a manner entirely similar to that just explained, a succession of positive and negative 1—cosine pulses are applied through the reversing switch 64 to the input of amplifier 16 there to be integrated with the incoming analog signal. The succession of integrations is shown in FIGURE 2 of the drawings and, as it is observed in this figure, the composite integral has a gradual slope upward in the manner of the integral of the analog input potential. Also, from time 0 to time $t_8$, the extremities of the unit integrals fall on opposite sides of the zero potential reference line. It is observed, however, that during the interval from time $t_8$ to time $t_9$, the lower extremity of the wave 94 terminating at time $t_9$, unlike all of the other decreasing integrals preceding it, does not drop below the zero potential reference line. Thus, under these circumstances, at the end of the period the integrated potential at the output of amplifier 16 is positive and rather than conditioning the AND circuit 48 at this point, the AND circuit 52 is again conditioned as it was at time $t_8$ because of its inputs receives a positive potential. Also, the flip-flop circuit 58, rather than being reset, remains in the set state. Thus, the 1—cosine potential pulse rather than being applied during time $t_9$ to $t_{10}$ in a direction reverse from that during time $t_8$ to $t_9$ is applied in the same polarity. The potential at the integrator, thus, drops as shown at 96 to a value below the zero potential reference line.

For producing digital outputs indicative of the analog input, the pulse shaper circuit 64 produces a positive potential pulse for each full wave produced by the oscillator 20. Thus, upon the coincidence of a positive pulse applied by the shaper circuit to one input of the AND circuit 60 and a set condition of the flip-flop circuit 58, a positive output pulse, as shown at 98 in FIGURE 2, is produced at the output of this AND circuit. Similarly, in the reset condition of flip-flop 58, both inputs of AND circuit 62 are conditioned, producing an output, as shown at 100. In this way, AND circuit 60 produces an output for each positive 1—cosine pulse applied to the integrator and AND circuit 62 produces an output for each negative 1—cosine pulse applied to the integrator. Accordingly, a suitable counter, indicating the difference in the number of pulses from circuits 60 and 62 over a period of time, yields, in digital form, the equivalent to the analog input applied to terminal 12. It is clear, for example, that a larger (more negative) input potential applied at input terminal 12 would cause the succession of potential integrals, as shown at 90 and 92, to rise at a faster rate, whereby for the same period of time, the succession of two 1—cosine waves of the same polarity applied to the integrator, would occur sooner than in the situation shown and described. The disparity in pulses at the outputs of AND circuits 60 and 62 would be commensurate and, thus, the more negative input potential would result in a larger difference in number of output pulses over the same interval of time, large enough to yield a meaningful result.

In accordance with this embodiment, the integrator circuit is reset by positive or negative 1—cosine pulses as the case may be. These pulses, in comparison with pulses utilized in prior systems for resetting the integrator amplifier circuits, are relatively free of harmonic content and, thus, the content of impulses applied to reset the integrator depends to a much greater extent on the fundamental wave. The harmonic contribution is of a much lesser significance than in prior circuits. A comparison is shown in FIGURE 3 of the drawings which is a semilogarithmic plot of the pulse area contribution in percent versus the several different odd harmonics which may be present in this type of a wave. It is noted that the cosine factors and even harmonics are eliminated in the alternate negative, zero and positive impulses. In FIGURE 3, the curve 104 represents the plot of pulse area contribution percent for the respective harmonics in a square wave resetter circuit; the curve 106 represents the pulse area contribution percent for the respective harmonics for the alternative half-wave pulses, and the curve 108 represents the pulse area contribution percent for the respective harmonics by the use of the 1—cosine wave. It is observed that for the third harmonic the pulse area contribution of the 1—cosine wave is of the order of 7 percent, while the contributions of the square wave and half-sine waves are of the order of 13 and 24 percent. Similarly, for the fifth harmonic, for example, the contribution of the 1—cosine wave is of the order of .6 percent, while the contribution of the half-sine is of the order of 3.5 percent and the square wave contribution is of the order of 4.5 percent. Accordingly, it is observed that for these harmonics and other harmonics for which the graph includes the 1—cosine wave, this wave is superior by a factor of several fold in its relative freedom from harmonic content. Accordingly, the resetting operation of the circuit shown in FIGURE 1 of the drawings can be performed with significantly greater accuracy, yielding significantly more accurate results.

In accordance with another embodiment of the invention, provision is made for producing sine$^2$ type pulses rather than 1—cosine pulses and for resetting integrator 16 with such pulses. Circuitry for producing such pulses is shown in FIGURE 4, wherein components similar to components shown in FIGURE 1 are designated by the same numerals primed. In FIGURE 4, an oscillator 20′ produces a sinusoidal potential as shown at 102 in FIGURE 5. The potential 102 is of a relatively low value and is applied across a rectifying circuit including a diode 104 in series with a resistor 106 and connected across the oscillator output. The diode has its cathode connected to resistor 106 and, thus, passes only positive pulses as shown at 108 in FIGURE 5. Because of the non-linear characteristics of a diode as shown at 104, especially for very low potential values as may be seen by the characteristic curve in FIGURE 6, the pulses 108 are not true one-half sine wave pulses but are distorted, especially near zero values and possess sine$^2$ characteristics. For emplifying pulses 108 to more useful values, the junction between diode 104 and resistor 106 is connected to the input of an amplifier 110 producing output pulses proportional to sine$^2$ type as shown at 112 in FIGURE 5. The output of amplifier 110 is connected to the input of alternating potential regulator 22′ for applying the pulses 112 thereto. It will be appreciated that except for the inclusion of diode 104, resistor 106, and amplifier 110, the circuit of FIGURE 4 is entirely similar to the circuit of FIGURE 1. Thus, the output of alternating potential regulator 22′ is superimposed upon a direct potential from direct potential regulator 32′ in the transformer 26′ to produce the sine$^2$ waveform as shown at 114 in FIGURE 5. As in the case of the 1—cosine type pulses of FIGURE 1, the amplitude of the alternating potential applied to primary winding 24′ is maintained slightly greater than the amplitude of the direct potential applied to secondary winding 34′. Accordingly, the periodic sine$^2$ waveform made available on line 39′ extends slightly negative during each cycle thereof as clearly shown at 116 in FIGURE 5, for example. Regulation of the amplitude of wave 112 and of the amplitude of the D.C. bias supplied by regulator 32′ is accomplished as before by use of the averaging circuit and the feedback from diode 45′ respectively. It should now be clear that the circuitry shown in FIGURE 4 is cooperative with other circuitry which is the same as that shown in FIGURE 1 and in an entirely similar manner. Accordingly, an explanation thereof is deemed redundant and is not included. Suffice it to say that the sine$^2$ type reset pulses utilized in the embodiment of FIGURES 4 through 6 have even less harmonic content than the 1—cosine type pulses utilized in the circuit of FIGURE 1 and therefore effect resetting of the integrator with even greater accuracy and precision.

What is claimed is:

1. Reset integrator apparatus comprising:

an integrator circuit having an input and a pair of outputs, one of said outputs being positive when said input is negative and the other of said outputs being negative when said input is positive, means for superimposing an alternating potential on a direct potential to produce a periodically varying waveform having a slightly negative excursion during at least a portion of each cycle thereof, means responsive to said last mentioned means for deriving a gating pulse each time said periodically varying waveform is negative, switch means having an input and an output and being actuatable between a first and a second condition, and gating means coupled to said pair of integrator outputs and being responsive to said gating pulse for actuating said reversing switch means to said first condition when one of said outputs is positive and to said second condition when the other of said outputs is negative, said switch means being operable when actuated to said first condition to apply said periodically varying waveform to said integrator input having a negative polarity and being operable when actuated to said second condition to apply said periodically varying waveform to said integrator input having a positive polarity to thereby reset said integrator by driving the latter's output toward zero.

2. Apparatus according to claim 1, wherein said gating means includes a pair of coincidence circuits each having a pair of inputs one of said inputs in each pair being connected to respective ones of said integrator outputs, wherein said pair of integrator outputs includes a pair of unidirectional devices interposed respectively in the connections therebetween said inputs of said coincidence circuits said undirectional devices having unlike electrodes connected to said integrator outputs, said gating pulse deriving means being coupled to the other inputs of said coincidence circuits with inverting means interposed between said pulse deriving means and one of said other inputs to one of said coincidence circuits, and means responsive to the outputs of said coincidence circuits for actuating said reversing switch means.

3. Apparatus according to claim 1 wherein said periodically varying waveform producing means includes an oscillator, a transformer, and a direct potential generator, said oscillator being coupled to the primary of said transformer and said direct potential generator being coupled to the secondary of said transformer.

4. Apparatus according to claim 3 further comprising, diode means having a non-linear potential versus current characteristic coupled to the output of said oscillator, and amplifier means interposed between said diode means and the primary of said transformer.

5. Apparatus according to claim 1 wherein said superimposing means includes potential level adjustment means to maintain the amplitude of said alternating potential slightly greater than the amplitude of said direct potential to thereby insure that said periodically varying waveform also has a slightly negative excursion during at least a portion of a cycle thereof.

6. The apparatus according to claim 1 further comprising a pair of output counting channels responsive to the actuation of said reversing switch means and operable to count the number of times said reversing switch means is in said first and second conditions respectively.

7. A reset integrator circuit comprising potential integrating means having a pair of inputs and an output and being effective to produce an integral of potentials applied to said inputs, means for detecting the polarity of potential at said integrating means output, means for producing a series of reset pulses derived from a periodic function corresponding to $E_0-E_1 \cos \omega t$, and gating means responsive to said detecting means for applying said reset pulses to one of the inputs of said integrating means in a polarity opposite to the polarity of the integrated potentials detected by said detecting means at said integrating means output whereby the magnitude of the integral of an analog potential applied to the other input of said integrating circuit is periodically reduced by the impulse content of each of said pulses.

8. A reset integrator circuit according to claim 7 wherein said pulse producing means includes means for producing alternating and direct potentials and means for superimposing an alternating potential on a direct potential coupled to said potential producing means, and wherein said gating means includes reversible switch means for coupling said superimposing means to said one input of said integrating means, said gating means being responsive to the coincident application of like polarity potentials thereto to control said switch means and to apply said pulses from said superimposing means to said one input of said integrating means of a polarity opposite to the polarity of said integrating means output, one of said like polarity potentials being derived from said superimposing means and the other of said like polarity potentials being derived from said detecting means.

9. A reset integrator circuit comprising an integrating circuit having plural inputs and an output and being effective to produce at said output an integral of potentials applied at said inputs, means for producing a series of pulses derived from a periodic waveform corresponding to the function $E \sin^2 \omega t$, gating means for applying said pulses to one of the inputs to said integrating means in a polarity opposite to the polarity of the integrated potentials at the output of said integrating circuit whereby the magnitude of the integral of an analog potential applied to the other input of said integrating circuit is periodically reduced by the impulse content of each of said pulses.

10. A reset integrator circuit, according to claim 9, wherein said means for producing sine$^2$ type pulses includes means for producing a sinusoidal potential, diode means having a non-linear potential versus current characteristic coupled to said potential producing means for suppressing the negative portion of said sinusoidal potential, and means for amplifying the remaining positive pulses passed by said diode means.

11. A reset integrator, according to claim 10, additionally comprising means for superimposing said amplified pulses on a direct potential, said superimposing means including means for rendering the minimum values of said pulses slightly negative during at least a portion of a complete cycle thereof, means for detecting the minimum values of said amplified pulses said gating means including coincident circuit means responsive to said detecting means and to the output potential of said integrating means for producing control potentials indicative of the polarity at said output, said gating means further including polarity reversing switch means responsive to said control potentials for applying said pulses to one of the inputs to said integrating means as hereinaforesaid.

12. A reset integrator comprising a circuit having plural inputs and an output and being effective to produce at said output, an integral of potentials applied to said inputs, means for producing a varying potential, means for producing a steady direct potential and means for superimposing said potentials to produce an alternating waveform potential having periodic minimal values of negative polarity, means for detecting only said periodic minimum values of negative polarity at the output of said superimposing means and for generating an output signal, gating means having inputs coupled to the output of said integrating means and responsive to said detecting means output signal and being actuated by the coincidence of signals from said integrating means output and said detecting means output to couple the output of said superimposing means to an input to said integrating means, said gating means including reversing switch means for alternately applying said alternating waveform potential in either polarity to said integrating means.

References Cited

UNITED STATES PATENTS

| | | | |
|---|---|---|---|
| 3,188,455 | 6/1965 | Quick | 235—183 |
| 3,192,371 | 6/1965 | Brahm | 235—183 |
| 3,322,942 | 5/1967 | Gerard et al. | 235—183 |

MALCOLM A. MORRISON, Primary Examiner

FELIX D. GRUBER, Assistant Examiner

U.S. Cl. X.R.

235—150.51; 307—229; 328—127